US008308025B2

(12) United States Patent
Nakajima et al.

(10) Patent No.: US 8,308,025 B2
(45) Date of Patent: Nov. 13, 2012

(54) MAGAZINE FOR SPOT WELDING CHIP

(75) Inventors: Toshio Nakajima, Kuwana (JP); Takeo Fukizawa, Kitanagoya (JP)

(73) Assignees: Shinkokiki Co., Ltd., Nagoya-Shi (JP); P&C Company Limited, Kuwana-Shi (JP)

( * ) Notice: Subject to any disclaimer, the term of this patent is extended or adjusted under 35 U.S.C. 154(b) by 110 days.

(21) Appl. No.: 12/916,700

(22) Filed: Nov. 1, 2010

(65) Prior Publication Data

US 2011/0042406 A1 Feb. 24, 2011

Related U.S. Application Data

(63) Continuation of application No. PCT/JP2008/001155, filed on May 8, 2008.

(51) Int. Cl.
*B23K 9/32* (2006.01)
(52) U.S. Cl. ....... 221/209; 221/224; 221/259; 219/86.8; 219/86.25
(58) Field of Classification Search ................ 221/209, 221/224, 229; 219/86.8, 86.25
See application file for complete search history.

(56) References Cited

U.S. PATENT DOCUMENTS

| | | | | |
|---|---|---|---|---|
| 3,724,715 A | * | 4/1973 | Auriemma | 221/4 |
| 4,794,221 A | * | 12/1988 | Takabe et al. | 219/86.8 |
| 5,150,818 A | * | 9/1992 | DeMoss | 221/228 |
| 5,387,774 A | * | 2/1995 | Boyer et al. | 219/86.33 |
| 5,734,141 A | * | 3/1998 | Voilmy et al. | 219/86.25 |
| 7,105,768 B2 | * | 9/2006 | Izumi et al. | 219/86.8 |
| 7,353,578 B2 | | 4/2008 | Nakajima et al. | |
| 7,966,706 B2 | * | 6/2011 | Fukizawa et al. | 29/244 |
| 2004/0149692 A1 | | 8/2004 | Masanori | |
| 2005/0023250 A1 | | 2/2005 | Izumi et al. | |

FOREIGN PATENT DOCUMENTS

| | | |
|---|---|---|
| GB | 1 378 394 A1 | 12/1974 |
| JP | 47-012708 A1 | 6/1972 |
| JP | 07-047478 A1 | 2/1995 |
| JP | 11-033745 A1 | 2/1999 |
| JP | 11-123565 A1 | 5/1999 |
| JP | 2003-103378 A1 | 4/2003 |
| JP | 2005-046888 A1 | 2/2005 |
| JP | 2006-068787 A1 | 3/2006 |
| WO | 2005/123321 A1 | 12/2005 |

* cited by examiner

*Primary Examiner* — Timothy Waggoner
(74) *Attorney, Agent, or Firm* — Burr & Brown

(57) ABSTRACT

A magazine for spot welding electrodes that stores mini chips and can feed the mini chips one by one. A mini chip storage portion and a cap chip storage portion slidably aligning and storing a plurality of mini chips and a plurality of cap chips are formed such that the mini chip storage portion and cap chip storage portion communicate with each other at one of their ends, where they open to the outside to serve as a supply port. When an arm is inserted into the supply port, a cap chip is mounted to the arm, as well as the cap chip presses the mini chip so that the mini chip is also mounted to the chip base. When the mounting operation is complete, a push-out member pushes the mini chips and cap chips so that the mini chips and cap chips are automatically fed to the supply port.

7 Claims, 18 Drawing Sheets

D-D

A-A

A-A

A-A

FIG. 18
(1)
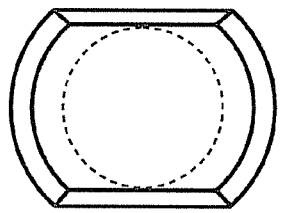
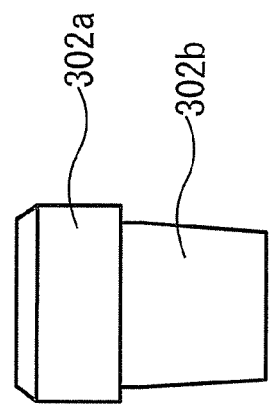
(2)
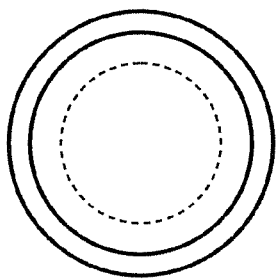
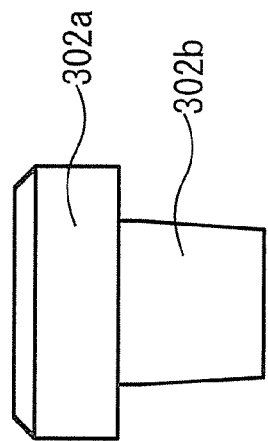

MAGAZINE FOR SPOT WELDING CHIP

BACKGROUND OF THE INVENTION

1. Field of the Invention

The present invention relates to a magazine for storing mini chips that are to be fitted to distal ends of chip bases of a spot welder.

2. Description of Related Art

Conventionally, spot welding has been widely used as one means for welding metal workpieces, wherein, with the metal workpieces being pressed together, electric current is applied, so as to melt and fuse the metal with the resistance heat. An automated welding line for spot welding body parts of cars is made up of a robot equipped with a welding gun, and a jig for securing and moving a workpiece to be welded. Alternatively, an automated welding line is made up of a stationary welding gun, and a robot that holds a workpiece to be welded and moves this workpiece to be welded toward the stationary welding gun.

The welding gun, as shown in FIG. 15, has opposing arms 190 and 191, with cap chips 195 fitted to the mounting portions 190a and 191a formed at the distal ends of the arms. In a process in which welding is performed using a welding gun mounted on a robot, the robot is operated to move the opposing arms 190 and 191 to a weld spot 252 of workpieces to be welded 250 and 251, and while the cap chips 195 are pressed against the workpieces to be welded 250 and 251, electric current is applied so as to weld the workpieces 250 and 251 together. Alternatively, in a process in which welding is performed using a stationary welding gun, the workpieces to be welded 250 and 251 are moved by the robot to the position between the opposing arms 190 and 191, and while the cap chips 195 are pressed against the weld spot 252 of the workpieces to be welded 250 and 251, electric current is applied so as to weld the workpieces 250 and 251 together.

In a welding gun such as the one shown in FIG. 15, when there is present a member 255 near the workpiece to be welded 250, the arm 190 and cap chip 195 cannot fit in between the workpiece to be welded 250 and the member 255 due to the large dimension α from the base of the mounting portion 190a to the distal end of the cap chip 195, so the workpieces 250 and 251 cannot be welded together. Therefore, for such welding spots, a chip base 301 such as the one shown in FIG. 16 is commonly used instead of the arm 190.

A mini chip 302 is mounted to the distal end of the chip base 301. FIG. 17 shows a detailed view of the chip base 301, and FIG. 18 shows a detailed view of the mini chip. As shown in FIG. 17, the chip base 301 has a plate-like shape, and the mini chip 302 is mounted in a mounting hole 301a formed at the distal end of the chip base 301 such as to extend therethrough. Therefore the thickness dimension β from the distal end of the chip base 301 to an abutment portion 302a of the mini chip 302 is small, so that even in a narrow space where there is present a member 255 close to the workpiece to be welded 250, the mini chip 302 can be moved to the weld spot 252 and the workpieces 250 and 251 can be welded together.

Performing the spot welding more than a predetermined number of times causes the distal end shape of the abutment portion 302a of the mini chip 302 or the cap chip 195 to suffer deformation and wear, making it harder to secure required welding quality. Therefore, when a certain period of processing time or a certain number of welding points is exceeded, the mini chip 302 or cap chip 195 need to be removed and replaced with new ones or those that have undergone a grinding treatment.

Conventionally, an operator would go inside the automated welding line that had been paused, and remove the cap chip 195 by inserting a tool for removing electrode chips such as the one shown in Patent Document 1 to the distal end of the arm 191, or remove the mini chip 302 by hitting its mounting portion 302b through the mounting hole 301a of the chip base 301. However, it was very dangerous for the operator to go inside the automated welding line, as it meant going inside a movable range of the robot arm. Also, for the operator to go inside the automated welding line, it was necessary to stop the automated welding line, which led to the problem that production efficiency was deteriorated. Further, in recent years, many of the materials to be welded are provided with rust proof treatment or the like using chemicals, because of which mini chips 302 and cap chips 195 tend to wear more quickly and need to be replaced more frequently. However, stopping the automated welding line each time to replace the mini chip 302 or cap chip 195 would lead to the problem of production efficiency being largely deteriorated.

Accordingly, a welder cap chip removing apparatus has been proposed as shown in Patent Document 2. This welder cap chip removing apparatus is made up of a fixed claw to be inserted into the distal end of the arm 191, a movable claw rotatably attached to a base end of this fixed claw such as to contact and separate from the fixed claw, and a rotating Mechanism that applies a rotating force to the movable claw. To remove the cap chip 195, the robot arm is moved to insert the distal end of the arm 191 in between the fixed claw and movable claw, and when the movable claw is separated from the fixed claw, the cap chip 195 is removed from the arm 191.

When using this welder cap chip removing apparatus shown in Patent Document 2, a magazine rack for a chip changer such as the one shown in Patent Document 3 is used for storing replacement cap chips. This magazine rack for a chip changer shown in Patent Document 3 is formed such that a plurality of cap chips 195 are stored inside a long columnar rack body and fed one by one to a supply port. With this magazine rack for a chip changer installed near the robot arm, a cap chip 195 can be automatically mounted to the arm 191 by moving the welding gun using the robot arm to insert the mounting portion 191a of the arm 191, from which the cap chip 195 has been removed, into the supply port of the magazine rack for a chip changer. By thus using the welder cap chip removing apparatus shown in Patent Document 2 and the magazine rack for a chip changer shown in Patent Document 3, automatic mounting and dismounting of cap chips 195 to and from the arm 191 of the welding gun in an automated welding line would be possible.

However, while the welder cap chip removing apparatus shown in Patent Document 2 can remove cap chips 195, it cannot remove mini chips 302, and therefore if there is even one process step in which mini chips 302 are used in the automated welding line, the automated welding line would still be stopped, as had been conventionally done, for the operator to go inside the automated welding line to remove the mini chip 302 from the chip base 301 and mount a new mini chip 302 to the chip base 301. Accordingly, the problem of the operator being exposed to danger, or the problem that the production efficiency of the automated welding line was largely deteriorated, would remain unsolved. Therefore, development of a magazine for spot welding chip for storing mini chips as well as a mini chip removing apparatus has been desired.

Patent Document 1: Japanese Published Unexamined Patent Application No. H11-123565

Patent Document 2: PCT/JP2004/011688

Patent Document 3: Japanese Published Unexamined Patent Application No. 2006-68787

SUMMARY OF THE INVENTION

Problems to be Solved by the Invention

An object of the present invention is to solve the above-described problems and to provide a magazine for spot welding electrodes that stores a plurality of mini chips and that can feed the mini chips one by one.

The invention devised to solve the conventionally encountered problems discussed above is characterized by comprising a magazine block formed with a mini chip storage portion slidably aligning and storing a plurality of mini chips therein along a front to back direction, a front end of this mini chip storage portion serving as an externally opened mini chip supply port; and a push-out mechanism that pushes out the mini chips stored inside the mini chip storage portion toward a side of the mini chip supply port to feed the mini chips to the mini chip supply port one by one.

The invention as set forth above is characterized in that, the push-out mechanism is formed such that:

a mini chip push-out member is slidably disposed inside the mini chip storage portion;

a pulley is disposed in a front part of the magazine block;

a spiral spring is disposed in a rear part of the magazine block;

a distal end of the spiral spring and the mini chip push-out member are coupled by a wire, with an intermediate part of the wire being wound around the pulley; and the mini chip push-out member is always pulled toward the side of the mini chip supply port by a biasing force of the spiral spring.

The invention as set forth above is characterized in that, the magazine block is formed with a cap chip storage portion in parallel with the mini chip storage portion, the cap chip storage portion slidably aligning and storing a plurality of cap chips therein, a front end of the cap chip storage portion serving as an externally opened cap chip supply port; and a push-out mechanism is provided that pushes out the cap chips stored inside the cap chip storage portion toward a side of the cap chip supply port to feed the cap chips to the cap chip supply port one by one.

The invention as set forth above is characterized in that, the push-out mechanism is formed such that:

a cap chip push-out member is slidably disposed inside the cap chip storage portion;

a pulley is disposed in a front part of the magazine block;

a spiral spring is disposed in a rear part of the magazine block;

a distal end of the spiral spring and the cap chip push-out member are coupled by a wire, with an intermediate part of the wire being wound around the pulley; and the cap chip push-out member is always pulled toward the side of the cap chip supply port by a biasing force of the spiral spring.

The invention as set forth above is characterized in that, the mini chip supply port and the cap chip supply port communicate with each other.

The invention as set forth above is characterized in that, a magazine body is formed to slide in a widthwise direction of the magazine body.

The invention as set forth above is characterized in that, a biasing means is provided for biasing the magazine body toward the side of the cap chip supply port.

The invention as set forth above is characterized in that, the magazine body is mounted on a slide member that slides in a given direction;

a through hole is formed in the slide member;

a shaft is passed through the through hole so as to slide the slide member in the widthwise direction of the magazine body; and a coil spring is attached to the shaft exposed from the through hole on the side of the mini chip supply port so as to bias the slide member toward the side of the cap chip supply port.

The invention as set forth above is characterized in that, a pressing mechanism having a pressing pin that slides in the widthwise direction of the magazine body and a coil spring that biases the pressing pin toward the side of the cap chip supply port is mounted to the magazine body such that a distal end of the pressing pin protrudes from an opening plane of the cap chip supply port with respect to the widthwise direction of the magazine body; and the biasing means that biases the magazine body toward the side of the cap chip supply port has a smaller biasing force than that of the coil spring.

The invention as set forth above is characterized in that, a coil spring is mounted to the magazine body such that a distal end of the coil spring protrudes from an opening plane of the cap chip supply port with respect to the widthwise direction of the magazine body; and the biasing means that biases the magazine body toward the side of the cap chip supply port has a smaller biasing force than that of the coil spring.

The invention as set forth above is characterized by comprising a magazine block formed with a mini chip storage portion slidably aligning and storing a plurality of mini chips therein along a front to back direction, a front end of this mini chip storage portion serving as an externally opened mini chip supply port; and a push-out mechanism that pushes out the mini chips stored inside the mini chip storage portion toward a side of the mini chip supply port to feed the mini chips to the mini chip supply port one by one.

Therefore, a plurality of mini chips are stored and the mini chips can be fed one by one, so that, in an automated welding line, a mini chip can be automatically mounted to a chip base by moving a welding gun, whereby, as it is no longer necessary to stop the automated welding line for an operator to go inside the automated welding line and mount the mini chip to the chip base, the problem of the operator being exposed to danger, or the problem that production efficiency of the automated welding line is largely deteriorated, can be solved.

The invention as set forth above is characterized in that, the push-out mechanism is formed such that a mini chip push-out member is slidably disposed inside the mini chip storage portion, and the mini chip push-out member is pulled by a spiral spring.

Therefore, when there are a fewer number of mini chips inside the mini chip storage portion, the mini chips are pushed against an end portion of the mini chip storage portion by the mini chip push-out member with an almost constant force, since the biasing force of the spiral spring is almost constant, and therefore the mini chips can be prevented from falling off from the mini chip supply port.

The invention as set forth above is characterized in that, the push-out mechanism is formed such that:

a pulley is disposed in a front part of the magazine block;

a spiral spring is disposed in a rear part of the magazine block;

a distal end of the spiral spring and the mini chip push-out member are coupled by a wire, with an intermediate part of the wire being wound around the pulley; and the mini chip push-out member is always pulled toward the side of the mini chip supply port by a biasing force of the spiral spring.

Therefore, by inverting the biasing direction of the spiral spring by means of the pulley, it has become possible to provide the spiral spring on the opposite side of the mini chip supply port of the magazine body, so that the area around the mini chip supply port is not bulky and the chip base of the welding gun can be prevented from interfering with the magazine body.

The invention as set forth above is characterized in that, the magazine block is formed with a cap chip storage portion in parallel with the mini chip storage portion, the cap chip storage portion slidably aligning and storing a plurality of cap chips therein, a front end of the cap chip storage portion serving as an externally opened cap chip supply port; and a push-out mechanism is provided that pushes out the cap chips stored inside the cap chip storage portion toward a side of the cap chip supply port to feed the cap chips to the cap chip supply port one by one.

Therefore, not only the mini chips, but also cap chips can be stored and supplied one by one.

The invention as set forth above is characterized in that, the push-out mechanism is formed such that a cap chip push-out member is slidably disposed inside the cap chip storage portion, and the cap chip push-out member is pulled by a spiral spring.

Therefore, when there are a fewer number of cap chips inside the cap chip storage portion, the cap chips are pushed against an end portion of the cap chip storage portion by the cap chip push-out member with an almost constant force, since the biasing force of the spiral spring is almost constant, and therefore the cap chips can be prevented from falling off from the cap chip supply port.

The invention as set forth above is characterized in that, the push-out mechanism is formed such that:

a pulley is disposed in a front part of the magazine block;

a spiral spring is disposed in a rear part of the magazine block;

a distal end of the spiral spring and the cap chip push-out member are coupled by a wire, with an intermediate part of the wire being wound around the pulley; and the cap chip push-out member is always pulled toward the side of the cap chip supply port by a biasing force of the spiral spring.

Therefore, by inverting the biasing direction of the spiral spring by means of the pulley, it has become possible to provide the spiral spring on the opposite side of the cap chip supply port of the magazine body, so that the area around the cap chip supply port is not bulky and the arm of the welding gun can be prevented from interfering with the magazine body.

The invention as set forth above is characterized in that, the mini chip supply port and the cap chip supply port communicate with each other.

Therefore, when a mounting portion of the arm is inserted into the cap chip supply port and the cap chip is mounted to the mounting portion of the arm, at the same time, a mini chip is pushed out of the mini chip supply port by the cap chip and mounted to the chip base, so that the mounting operation of the cap chip and mini chip can be carried out in a short time.

The invention as set forth above is characterized in that, a magazine body is formed to slide in a widthwise direction of the magazine body.

Therefore, when the mounting portion of the arm is inserted into the cap chip supply port to mount the cap chip to the mounting portion of the arm, the magazine body slides toward the chip base side, thereby bringing about a state in which the mini chip supply port communicates with the mounting hole of the chip base, so that the mini chip does not fall off from the mini chip supply port and the mounting portion of the mini chip can reliably be made to enter into the mounting hole of the chip base to reliably mount the mini chip to the chip base.

The invention as set forth above is characterized in that, a biasing means is provided for biasing the magazine body toward the side of the cap chip supply port.

Therefore, when mounting of the cap chip and mini chip is complete and the arm is opened from the chip base, the biasing force of the biasing means causes the magazine body to move to its initial position, and concurrently the mini chip mounted to the chip base is escaped from the mini chip supply port, so that the mini chip mounted to the chip base can be reliably escaped from the mini chip supply port.

The invention as set forth above is characterized in that, the magazine body is mounted on a slide member that slides in a given direction;

a through hole is formed in the slide member;

a shaft is passed through the through hole so as to slide the slide member in the widthwise direction of the magazine body; and a coil spring is attached to the shaft exposed from the through hole on the side of the mini chip supply port so as to bias the slide member toward the side of the cap chip supply port.

Therefore, the structure that allows for smooth sliding of the slide member and stable biasing of the slide member toward the cap chip supply port side can be realized.

The invention as set forth above is characterized in that, a pressing mechanism having a pressing pin that slides in the widthwise direction of the magazine body and a coil spring that biases the pressing pin toward the side of the cap chip supply port is mounted to the magazine body such that a distal end of the pressing pin protrudes from an opening plane of the cap chip supply port with respect to the widthwise direction of the magazine body; and the biasing means that biases the magazine body toward the side of the cap chip supply port has a smaller biasing force than that of the coil spring.

Therefore, when the mounting portion of the arm is inserted into the cap chip supply port to mount the cap chip to the mounting portion of the arm, the magazine body can be reliably slid toward the chip base side by the arm pressing the pressing pin, whereby the mini chip supply port and the mounting hole of the chip base can be reliably communicated with each other, so as to reliably mount the mini chip to the chip base.

The invention as set forth above is characterized in that, a coil spring is mounted to the magazine body such that a distal end of the coil spring protrudes from an opening plane of the cap chip supply port with respect to the widthwise direction of the magazine body; and the biasing means that biases the magazine body toward the side of the cap chip supply port has a smaller biasing force than that of the coil spring.

Therefore, when the mounting portion of the arm is inserted into the cap chip supply port to mount the cap chip to the mounting portion of the arm, the magazine body can be reliably slid toward the chip base side by the arm pressing the pressing pin, whereby the mini chip supply port and the mounting hole of the chip base can be reliably communicated with each other, so as to reliably mount the mini chip to the chip base.

BRIEF DESCRIPTION OF THE DRAWINGS

FIG. 18 is an explanatory diagram of a mini chip.

Figure 1:
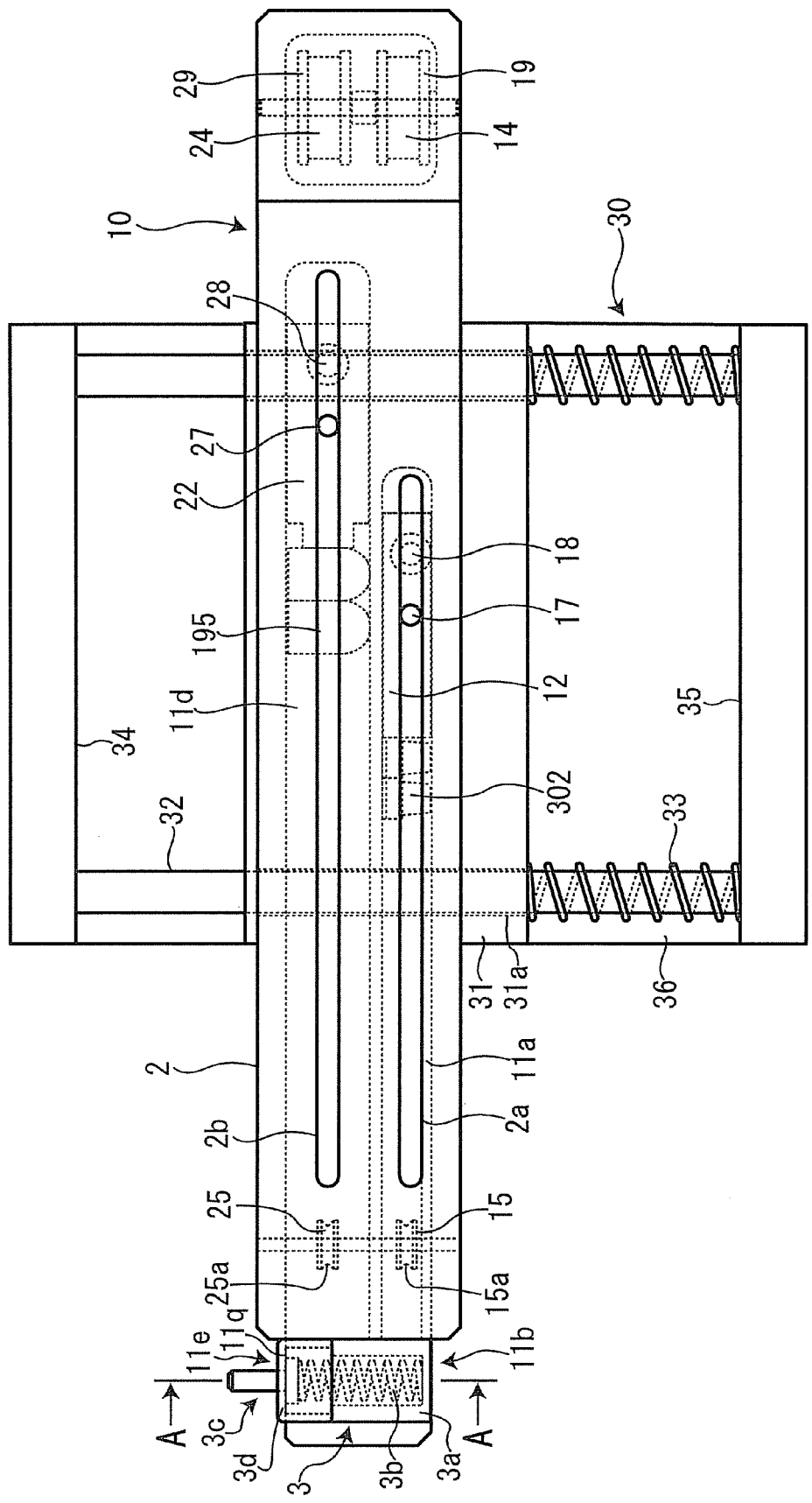
FIG. 1 is a top view of a magazine for spot welding chips, showing one embodiment of the present invention.

DESCRIPTION OF REFERENCE NUMERALS 2 cover plate
2a guide groove
2b guide groove
2c end face
3 pressing mechanism
3a main body
3b coil spring
3c pressing pin
3d cover member
3e insert hole
3f abutment portion
3g flange portion
3h base end face
3i distal end
7 fastening member
8 fastening member
10 magazine body
11 magazine block
11a mini chip storage portion
11b mini chip supply port
11d cap chip storage portion
11e cap chip supply port
11f hollow portion
11g guide groove
11h guide groove
11i bobbin storage portion
11j support portion
11k partition wall
11m opening plane
11n end portion
11p end portion
11q opening plane
12 mini chip push-out member
13 bottom plate
14 spiral spring
15 pulley
15a reel portion
16 wire
17 guide pin
18 guide pin
19 bobbin
22 cap chip push-out member
24 spiral spring
25 pulley
25a reel portion
26 wire
27 guide pin
28 guide pin
29 bobbin
30 base
31 slide member
31a through hole
32 shaft
33 coil spring
34 side plate
35 side plate
36 base plate
40 post
50 magazine for spot welding chip
190 arm
190a mounting portion
191 arm
191a mounting portion
191b inner side
195 cap chip
195a mounting recess
250 workpiece to be welded
251 workpiece to be welded
252 weld spot
255 member
301 chip base
301a mounting hole
301b cooling water passage
301c upper face
302 mini chip
302a abutment portion
302b mounting portion

DETAILED DESCRIPTION OF THE INVENTION (Description of the Mini Chip and Chip Base)

Mini chips 302 stored in the mini chip magazine 50 of the present invention will be described. As shown in FIG. 18(1), the mini chip 302 is made up of a columnar abutment portion 302a and a mounting portion 302b formed below the abutment portion 302a. The mounting portion 302b has a smaller outside diameter than the abutment portion 302a and is formed in a tapered shape so that the outside diameter decreases toward the lower end. The mini chip 302 may have a shape wherein both sides of the abutment portion 302a are cut off, as shown in FIG. 18(2).

Figure 17:
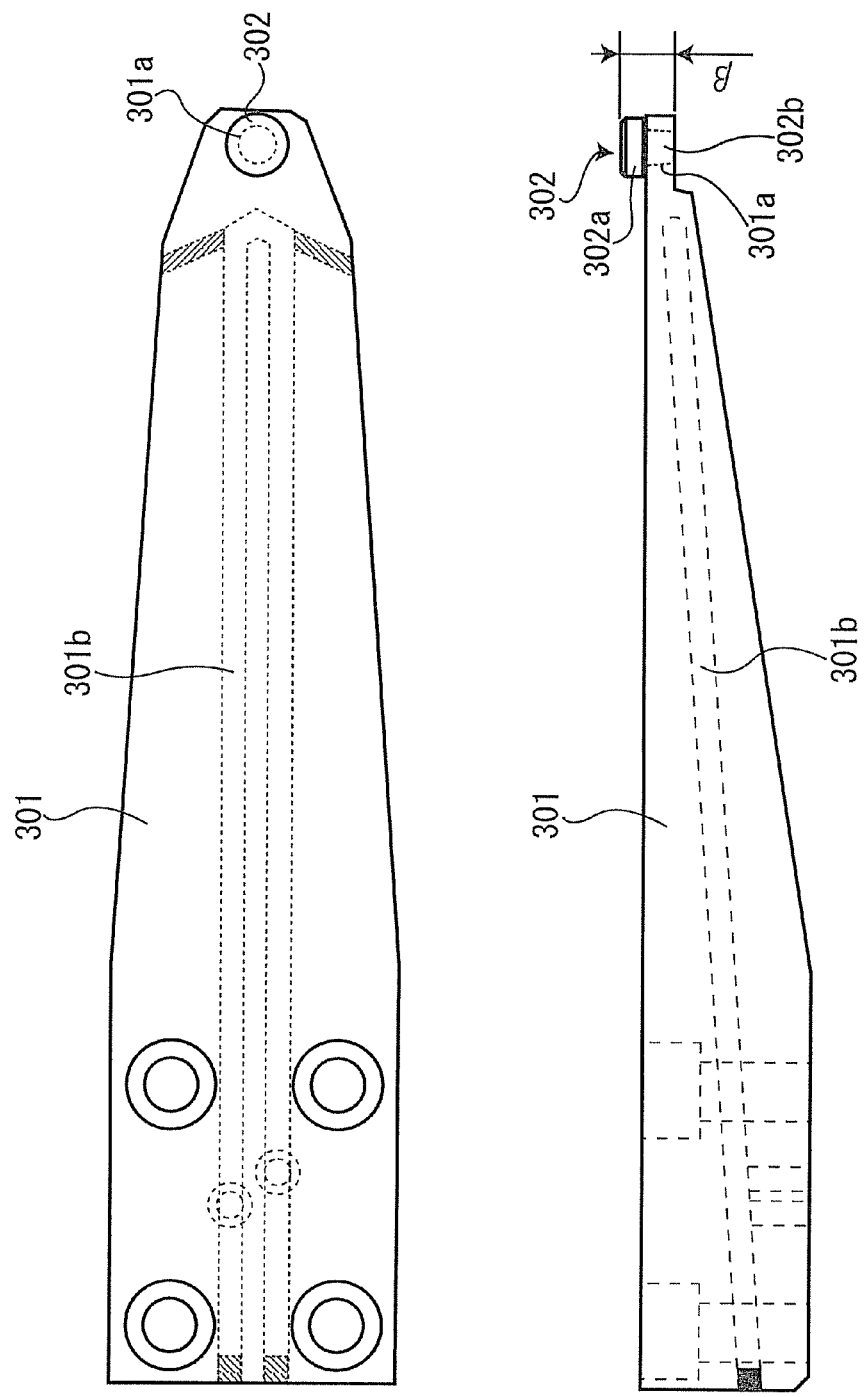
FIG. 17 is an explanatory diagram of a chip base.

The chip base 301 to which the mini chip 302 is mounted will be described. As shown in FIG. 17, the chip base 301 has a plate-like shape. The distal end of the chip base 301 is thinner as compared to other parts. At the distal end of the chip base 301, a mounting hole 301a is formed such as to extend through the plate. The mounting hole 301a is formed in a tapered shape wherein the inside diameter increases toward the side of the abutment portion 302a of the mini chip 302. The taper angle of the mounting hole 301a is the same angle as that of the mounting portion 302b. The mounting portion 302b of the mini chip 302 is inserted into the mounting hole 301a of the chip base 301 such as to fit therein so as to mount the mini chip 302 to the chip base 301. The chip base 301 is formed with a cooling water passage 301b that extends from the base end side to as far as near the mounting hole 301a. Cooling water circulating through the cooling water passage 301b cools the distal end of the chip base 301, thereby cooling the mini chip 302.

(Structure of the Magazine for Spot Welding Chips)

Figure 2:
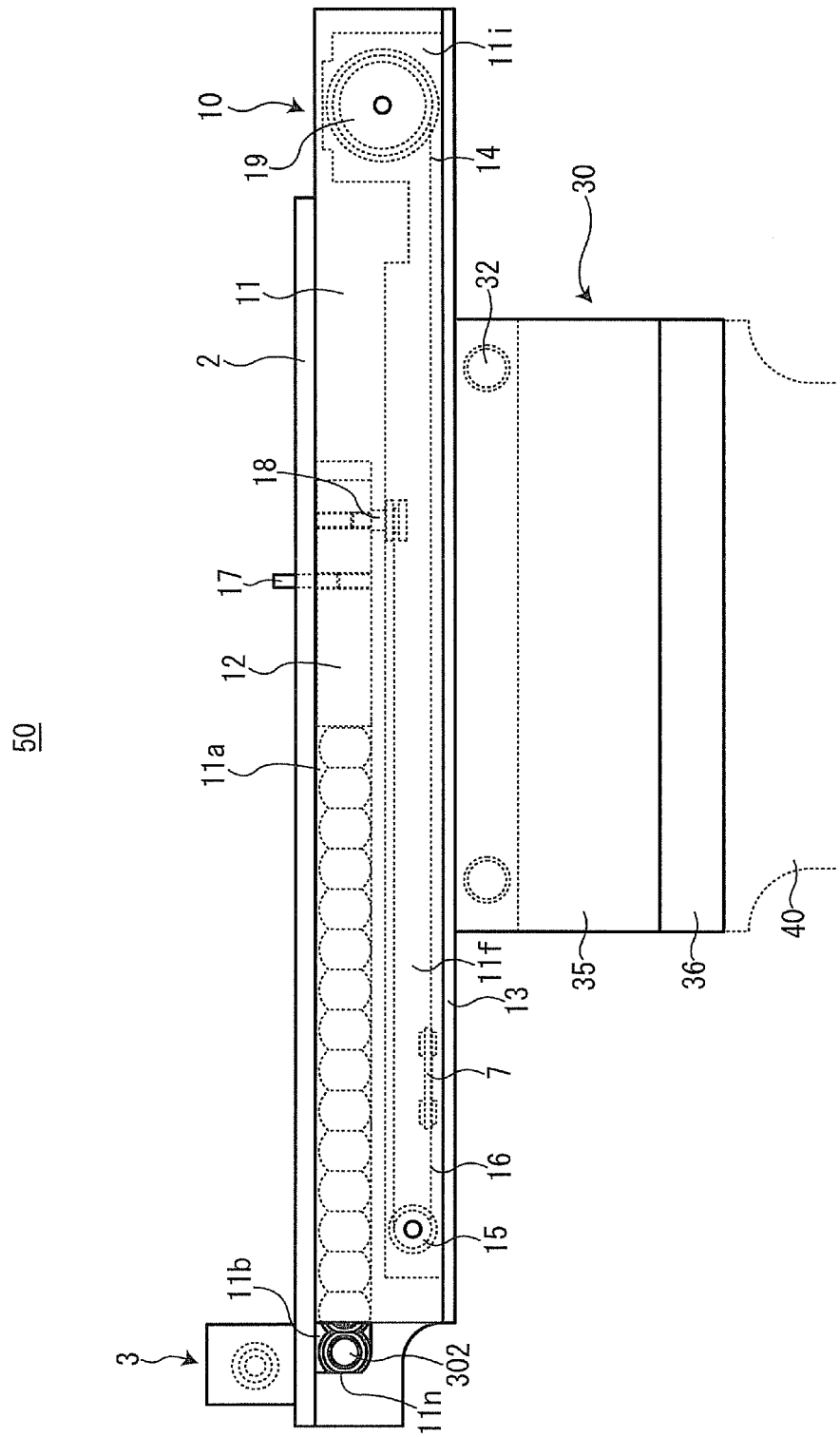
FIG. 2 is a side view of a magazine for spot welding chips, showing one embodiment of the present invention.
Figure 3:
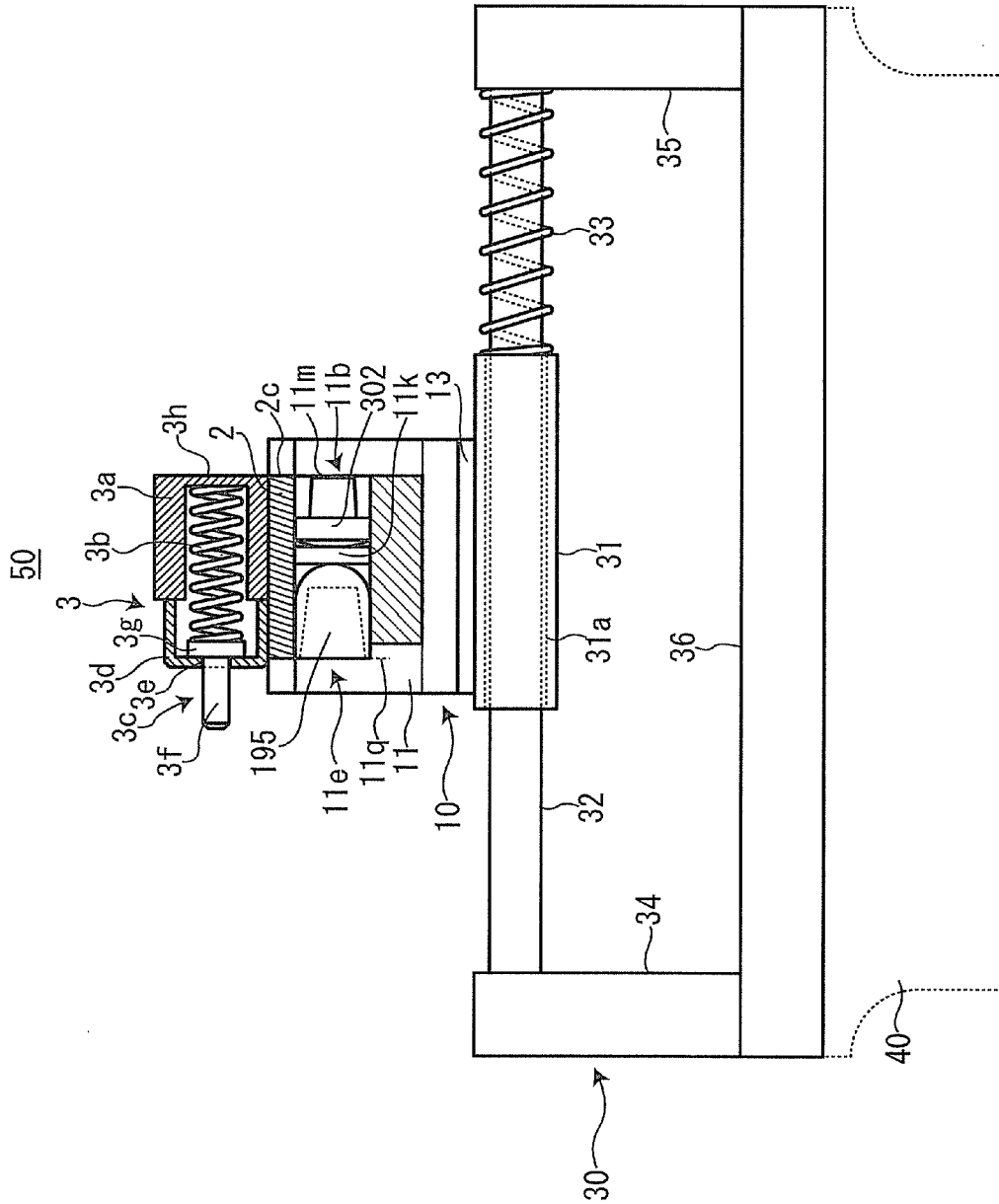
FIG. 3 is a cross sectional view taken along A-A of FIG. 1.

Hereinafter preferred embodiments of the present invention will be described with reference to the drawings. FIG. 1 is a top view of a magazine 50 for spot welding chips of the present invention, FIG. 2 is a side view of FIG. 1, and FIG. 3 is a cross sectional view taken along A-A of FIG. 1. The magazine 50 for spot welding chips of the present invention is made up of a magazine body 10, a pressing mechanism 3, and a base 30.

Figure 4:
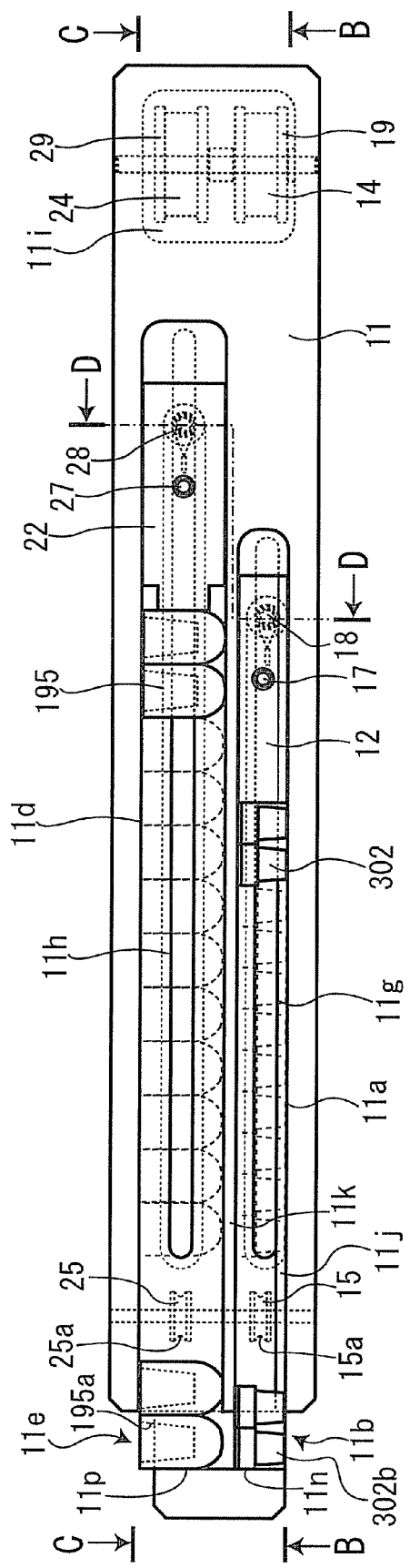
FIG. 4 is a top view of the magazine body (with the cover plate being removed).
Figure 5:
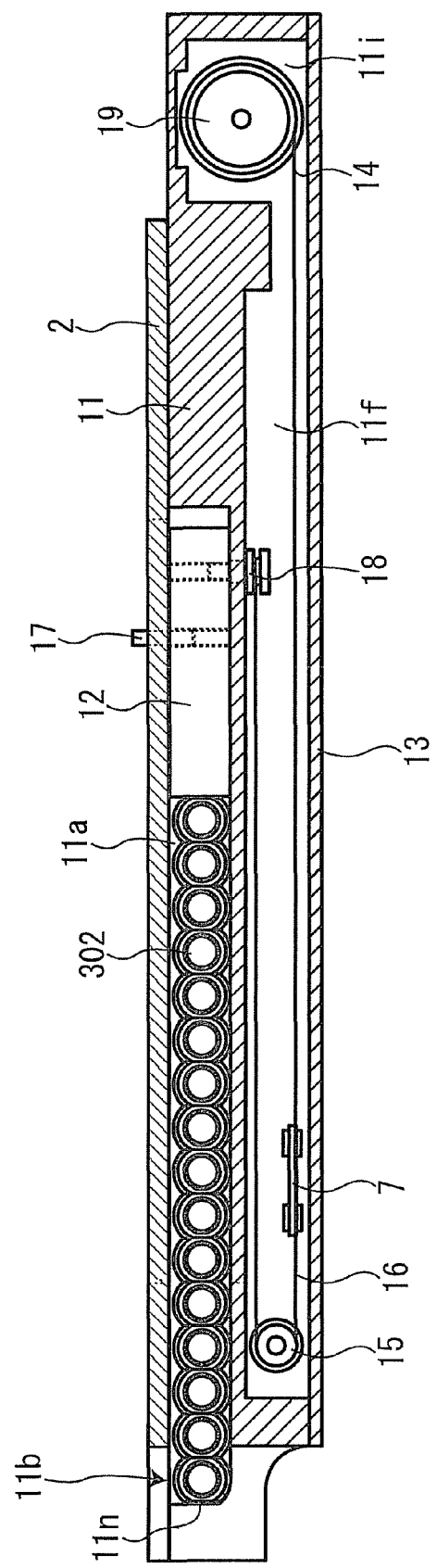
FIG. 5 is a cross sectional view taken along B-B of FIG. 4.
Figure 6:
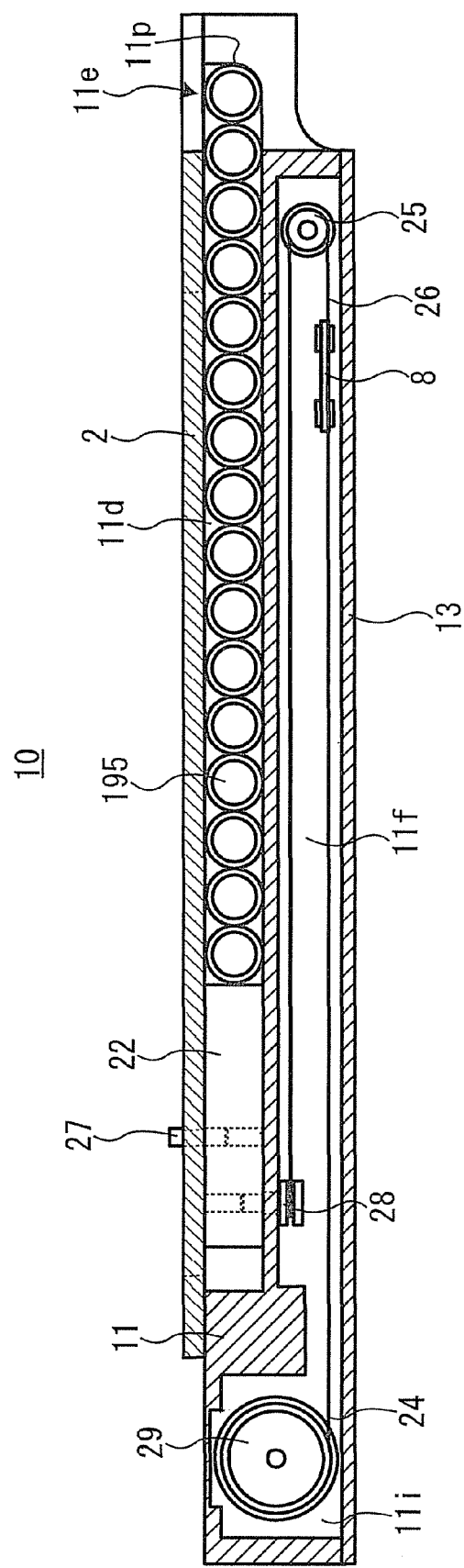
FIG. 6 is a cross sectional view taken along C-C of FIG. 4.
Figure 7:
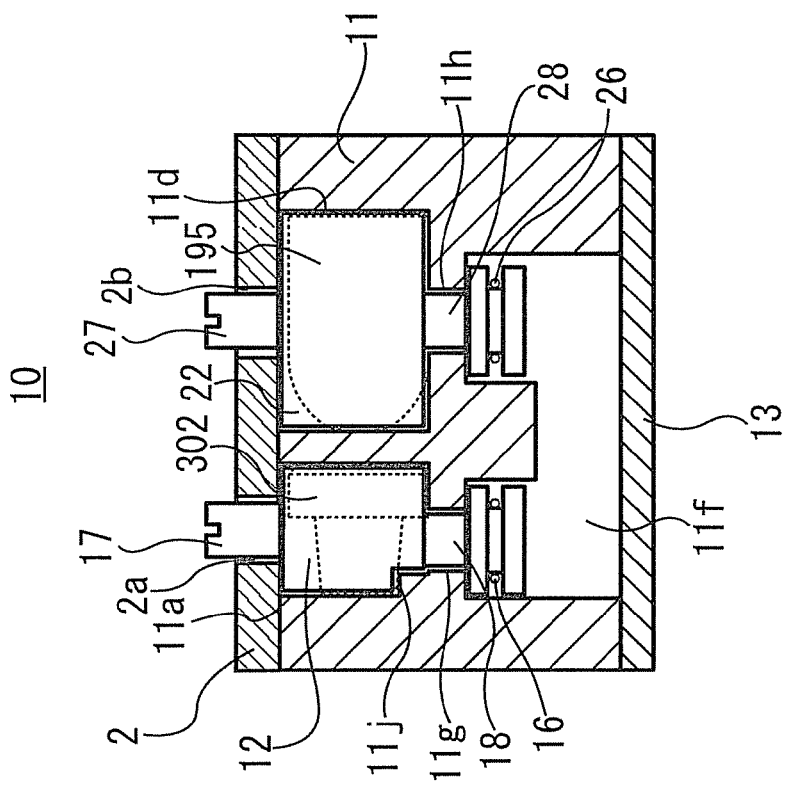
FIG. 7 is a cross sectional view taken along D-D of FIG. 4.

FIG. 4 shows a top view of the magazine body 10, FIG. 5 shows a cross sectional view taken along B-B of FIG. 4, and FIG. 6 shows a cross sectional view taken along C-C of FIG. 4. FIG. 7 shows a cross sectional view taken along D-D of FIG. 4. The magazine body 10 is mainly made up of magazine block 11, mini chip push-out member 12, spiral spring 14, pulley 15, bobbin 19, cap chip push-out member 22, spiral spring 24, pulley 25, bobbin 29, cover plate 2, and bottom plate 13. FIG. 4 shows a state in which the cover plate 2 has been removed so that the inner structure is visible.

The magazine block 11 is in the form of an elongated block. The magazine block 11 is formed with a mini chip storage portion 11a oriented along a lengthwise direction (front to back direction). In this embodiment, the mini chip storage portion 11a is formed in a recessed shape along a straight line in the magazine block 11, having an externally opened shape. The front end of the mini chip storage portion 11a serves as a mini chip supply port 11b. As shown in FIG. 2, the mini chip supply port 11b opens to the outside (in the widthwise direction of the magazine body 10). The width of the mini chip storage portion 11a is slightly larger than the height of the mini chips 302. The mini chips 302 are slidably aligned and stored inside the mini chip storage portion 11a such that the mini chips 302 are on their sides so that their mounting portions 302b are oriented to the side of the supply port 11b.

As shown in FIG. 7, a bottom portion of the mini chip storage portion 11a on the side of the mini chip supply port 11b is protruded upward, thereby forming a support portion 11j. With this structure, the support portion 11j abuts on the mounting portions 302b of the mini chips 302 and supports the mounting portions 302b, so that the mini chips 302 stored in the mini chip storage portion 11a do not tilt. The support portion 11j is not formed near the mini chip supply port 11b so as to allow the mini chips 302 to get out from the mini chip supply port 11b. Although the support portion 11j is not formed near the mini chip supply port 11b, as will be described later, the mini chips 302 are pressed against an end portion 11n of the mini chip storage portion 11a by the mini chip push-out member 12, so that the mini chips 302 do not tilt and stay held.

The magazine block 11 is formed with a cap chip storage portion 11d in parallel with the mini chip storage portion 11a. In this embodiment, the cap chip storage portion 11d is formed in a recessed shape along a straight line in the magazine block 11, having an externally opened shape. The front end of the cap chip storage portion 11d serves as a cap chip supply port 11e. The cap chip supply port 11e opens to the outside (in the widthwise direction of the magazine body 10). The width of the cap chip storage portion 11d is slightly larger than the height of the cap chips 195. The cap chips 195 are aligned and stored inside the cap chip storage portion 11d such that the cap chips 195 are on their sides so that their mounting recesses 195a are oriented to the side of the cap chip supply port 11e.

As shown in FIG. 4, there is a partition wall 11k between the mini chip storage portion 11a and cap chip storage portion 11d. This partition wall 11k is formed as far as to a point before the mini chip supply port 11b and cap chip supply port 11e. In other words, there is no partition wall 11k at the positions of the mini chip supply port 11b and cap chip supply port 11e so that the mini chip supply port 11b and cap chip supply port 11e communicate with each other.

As shown in FIGS. 5 and 6, below the mini chip storage portion 11a and cap chip storage portion 11d of the magazine block 11 is formed a hollow portion 11f. In this embodiment, the hollow portion 11f is open on the underside.

As shown in FIG. 4, at the bottom portion of the mini chip storage portion 11a, a guide groove 11g that communicates with the hollow portion 11f is formed along the lengthwise direction of the mini chip storage portion 11a. Similarly, at the bottom portion of the cap chip storage portion 11d, a guide groove 11h that communicates with the hollow portion 11f is formed along the lengthwise direction of the cap chip storage portion 11d.

At one end of the hollow portion 11f on the opposite side of the mini chip supply port 11b (cap chip supply port 11e) is formed a bobbin storage portion 11i.

As shown in FIGS. 5 to 7, the bottom plate 13 that closes the hollow portion 11f is attached to the underside of the magazine block 11.

The mini chip push-out member 12 is slidably disposed inside the mini chip storage portion 11a. The mini chip push-out member 12 is in the shape of a block, and as shown in FIG. 7, the cross-sectional shape of the mini chip push-out member 12 conforms to that of the mini chip storage portion 11a.

The cap chip push-out member 22 is slidably disposed inside the cap chip storage portion 11d. The cap chip push-out member 22 is in the shape of a block. As shown in FIG. 7, the cross-sectional shape of the cap chip push-out member 22 conforms to that of the cap chip storage portion 11d.

The cover plate 2 is disposed on the upper side of the magazine block 11 to close the mini chip storage portion 11a and cap chip storage portion 11d. This cover plate 2 prevents foreign matter from entering the mini chip storage portion 11a and cap chip storage portion 11d. The cover plate 2 is formed with a guide groove 2a that runs along the mini chip storage portion 11a and communicates with the mini chip storage portion 11a. The cover plate 2 is also formed with a guide groove 2b that runs along the cap chip storage portion 11d and communicates with the cap chip storage portion 11d.

A guide pin 17 protrudes from the upper face of the mini chip push-out member 12. As shown in FIGS. 1 and 2, the guide pin 17 extends through the guide groove 2a of the cover plate 2 and protrudes from the cover plate 2. A guide pin 18 protrudes from the lower face of the mini chip push-out member 12. The guide pin 18 extends through the guide groove 11g and protrudes into the hollow portion 11f. This structure allows the guide pins 17 and 18 to slidably engage with the guide grooves 2a and 11g, respectively, so that the mini chip push-out member 12 can smoothly slide between both ends of the mini chip storage portion 11a without wobbling.

Similarly, a guide pin 27 protrudes from the upper face of the cap chip push-out member 22. As shown in FIG. 1, the guide pin 27 extends through the guide groove 2b of the cover plate 2 and protrudes from the cover plate 2. A guide pin 28 protrudes from the lower face of the cap chip push-out member 22. The guide pin 28 extends through the guide groove 11h and protrudes into the hollow portion 11i. This structure allows the guide pins 27 and 28 to slidably engage with the guide grooves 2b and 11h, respectively, so that the cap chip push-out member 22 can smoothly slide between both ends of the cap chip storage portion 11d without wobbling.

In a front part of the magazine block 11 is disposed the pulley 15. In this embodiment, the pulley 15 is disposed inside the hollow portion 11i below the mini chip supply port 11b. The pulley 15 is substantially columnar and formed with a reel portion 15a that is in a recessed shape and extends all around the entire circumference. The pulley 15 is rotatably attached with a shaft to the magazine block 11.

Similarly, in the front part of the magazine block 11 is disposed the pulley 25. In this embodiment, the pulley 25 is disposed inside the hollow portion 11f below the cap chip supply port 11e. The pulley 25 is substantially columnar and formed with a reel portion 25a that is in a recessed shape and extends all around the entire circumference. The pulley 25 is rotatably attached with a shaft to the magazine block 11.

The bobbins 19 and 29 are disposed side by side inside the bobbin storage portion 11i. In other words, the bobbins 19 and 29 are disposed at a position on the opposite side of the mini chip supply port 11b (cap chip supply port 11e) of the magazine block 11, i.e., in the rear part of the magazine block 11. The bobbins 19 and 29 are in a reel shape and rotatably attached with a shaft to the magazine block 11. The spiral springs 14 and 24 are respectively wound around the bobbins 19 and 29. The spiral springs 14 and 24 are formed of a resilient metal plate material in a spiral shape. The spiral springs 14 and 24 are resilient so that even if the distal ends of the spiral springs 14 and 24 are pulled, they wind back up in the coil form and restore to their original shapes.

The distal end of the spiral spring 14 is coupled to one end of the wire 16 by means of a fastening member 7. An intermediate part of the wire 16 is wound around the pulley 15, and the other end of the wire 16 is coupled to the mini chip push-out member 12. In this embodiment, the other end of the wire 16 is coupled to the protruding end of the guide pin 18. With this structure, the spiral spring 14 pulls the mini chip push-out member 12 toward the side of the mini chip supply port 11b through the wire 16.

Similarly, the distal end of the spiral spring 24 is coupled to one end of the wire 26 by means of a fastening member 8. An intermediate part of the wire 26 is wound around the pulley 25, and the other end of the wire 26 is coupled to the cap chip push-out member 22. In this embodiment, the other end of the wire 26 is coupled to the protruding end of the guide pin 28. With this structure, the spiral spring 24 pulls the cap chip push-out member 22 toward the side of the cap chip supply port 11e through the wire 26.

As shown in FIGS. 1 and 2, the pressing mechanism 3 is disposed above the cap chip supply port 11e of the magazine body 10. In this embodiment, the pressing mechanism 3 is attached on the cover plate 2. As shown in FIGS. 1 and 3, the pressing mechanism 3 is made up of a main body 3a, coil spring 3b, pressing pin 3c, and cover member 3d. The main body 3a has a box-like shape open on the side of the cap chip supply port 11e.

The cover member 3d is tubular and has a bottom. The cover member 3d is attached to the main body 3a such as to close the opening of the main body 3a. The cover member 3d is formed with an insert hole 3e that opens toward the side of the cap chip supply port 11e.

The pressing pin 3c is made up of an abutment portion 3f and a flange portion 3g. The abutment portion 3f is columnar. The flange portion 3g is in a flange shape and integral with the base end of the abutment portion 3f. As shown in FIG. 3, the pressing pin 3c is slidably attached to the cover member 3d such that, with the flange portion 3g on the inner side of the cover member 3d, the abutment portion 3f is passed through the insert hole 3e in the cover member 3d to protrude out from the insert hole 3e. The pressing pin 3c slides in the widthwise direction of the magazine body 10.

The coil spring 3b is accommodated inside the space formed by the main body 3a and cover member 3d. The coil spring 3b abuts on the flange portion 3g of the pressing pin 3c and always biases the pressing pin 3c toward the side of the cap chip supply port 11e. The distal end of the abutment portion 3f of the pressing pin 3c protrudes from an opening plane 11q of the cap chip supply port 11e with respect to the widthwise direction of the magazine body 10.

As shown in FIG. 3, the opening plane 11m of the mini chip supply port 11b and the end face 2c of the cover plate 2 on the side of the mini chip supply port 11b are coplanar with respect to the widthwise direction of the magazine body 10. In this embodiment, the base end face 3h of the main body 3a is also coplanar with the end face 2c of the cover plate 2 with respect to the widthwise direction of the magazine body 10.

Next, the base 30 will be described. The base 30 is made up of a slide member 31, shaft 32, coil spring 33, side plate 34, side plate 35, and base plate 36. The magazine body 10 is mounted on the slide member 31. The slide member 31 has a plate-like shape in the illustrated embodiment. The slide member 31 is formed with a plurality of through holes 31a extending through the magazine body 10 in its widthwise direction. In this embodiment, through holes 31a are formed in the slide member 31 at two locations in a front to back direction of the magazine body 10.

Shafts 32 are passed through the through holes 31a of the slide member 31. The shafts 32 are supported at both ends respectively by the side plate 34 and side plate 35. The cap chip supply port 11e is on the side of the side plate 34, while the mini chip supply port 11b is on the side of the side plate 35. Side plates 34 and 35 are mounted on the base plate 36. With this structure, the slide member 31 is slidable relative to the base plate 36. That is, the magazine body 10 is slidable in the widthwise direction of the magazine body 10. Instead of using the shafts 32, the slide member 31 may be mounted on rails to configure the slide member 31 slidable in the widthwise direction of the magazine body 10.

The coil spring 33 is attached to the shaft 32 exposing from the through hole 31a on the side of the mini chip supply port 11b. In other words, the coil spring 33 is attached on an outer circumferential surface of the shaft 32 in between the slide member 31 and side plate 35. Therefore, the slide member 31 is always biased toward the side of the cap chip supply port 11e. With this structure, the magazine body 10 is always biased toward the side of the side plate 34 (cap chip supply port 11e side). The coil spring 33 is attached at both ends to the slide member 31 and side plate 35, respectively. Therefore, when it is attempted to move the slide member 31 toward the side of the side plate 34 beyond the natural length of the coil spring 33, the slide member 31 is pulled back by the coil spring 33 toward the side plate 35. The spring constant of the coil spring 33 is smaller than that of the coil spring 3b. In this embodiment, the spring constant of the coil spring 33 is about 2.5 N/mm, while the spring constant of the coil spring 3b is about 4.5 N/mm.

The base plate 36 of the base 30 is mounted on a post 40 disposed on the floor surface of an automated welding line.

(How the Mini Chips and Cap Chips are Stored)

To store mini chips 302 in the magazine 50 for spot welding chips of the present invention, the guide pin 17 is first slid toward the bobbin 19 side so as to slide the mini chip push-out member 12 toward the bobbin 19 side. This makes space in between the mini chip supply port 11b and mini chip push-out member 12, and the plurality of mini chips 302 are inserted into the mini chip storage portion 11a of this space and stored in a line. When the guide pin 17 is released, the restoring force (biasing force) of the spiral spring 14 pulls the mini chip push-out member 12 toward the supply port 11b side. The mini chips 302 stored inside the mini chip storage portion 11a are pushed against the end portion 11n on the side of the mini chip supply port 11b of the mini chip storage portion 11a by the mini chip push-out member 12 and retained, so that the mini chips 302 do not fall off from the mini chip supply port 11b.

To store cap chips 195 in the magazine 50 for spot welding chips, the guide pin 27 is first slid toward the bobbin 29 side so as to slide the cap chip push-out member 22 toward the bobbin 29 side. This makes space in between the cap chip supply port 11e and cap chip push-out member 22, and the plurality of cap chips 195 are inserted into the cap chip storage portion 11d of this space and stored in a line. When the guide pin 27 is released, the restoring force (biasing force) of the spiral spring 24 pulls the cap chip push-out member 22 toward the supply port 11e side. The cap chips 195 stored inside the cap chip storage portion 11d are pushed against the end portion 11p on the side of the cap chip supply port 11e of the cap chip storage portion 11d by the cap chip push-out member 22 and retained, so that the cap chips 195 do not fall off from the cap chip supply port 11e.

A locking mechanism (not shown) is provided at the back of the mini chip push-out member 12 or cap chip push-out member 22, so that when the mini chip push-out member 12 or cap chip push-out member 22 is slid to the back, the locking mechanism locks the mini chip push-out member 12 or cap chip push-out member 22 and prevents them from sliding to the front. Therefore, even when the guide pin 17 or guide pin 27 is released, mini chips 302 or cap chips 195 can still be stored into the mini chip storage portion 11a or cap chip storage portion 11d. After the mini chips 302 or cap chips 195 are stored in the mini chip storage portion 11a or cap chip storage portion 11d, the lock by the locking mechanism is released.

(How the Mini Chips and Cap Chips are Mounted)

Next, how a cap chip 195 is mounted to an arm 191 and a mini chip 302 is mounted to a chip base 301 using the magazine 50 for spot welding chips of the present invention will be described. FIGS. 8 to 13 show explanatory diagrams of how the mini chips 302 and cap chips 195 are mounted. FIGS. 8 to 13 are cross sections taken along A-A of FIG. 1.

Figure 8:
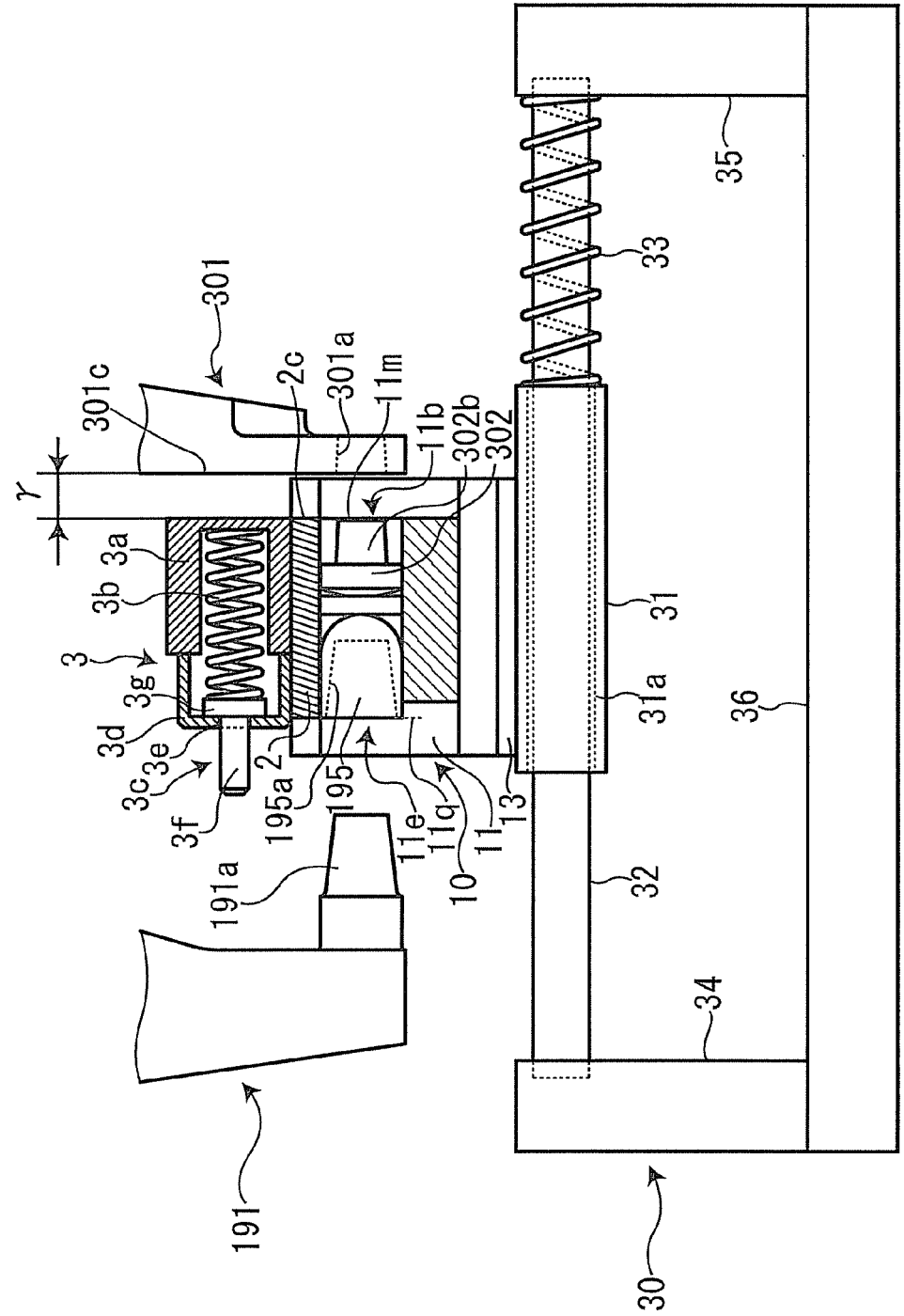
FIG. 8 is an explanatory diagram of how a, mini chip and a cap chip are mounted.

As shown in FIG. 8, a welding gun is moved by a robot arm to a position where the mounting portion 191a of the arm 191 coincides with the cap chip supply port 11e, while the mounting hole 301a of the chip base 301 coincides with the mini chip supply port 11b, with respect to the up and down direction and front to back direction of the magazine 50 for spot welding chips. That is, in this state, the mounting portion 191a of the arm 191 coincides with the mounting recess 195a of the cap chip 195, while the mounting portion 302b of the mini chip 302 coincides with the mounting hole 301a of the chip base 301, with respect to the up and down direction and front to back direction of the magazine 50 for spot welding chips. Here, the upper face 301c of the chip base 301 is separated by a predetermined distance γ from the end face 2c of the cover plate 2 or the opening plane 11m of the mini chip supply port 11b.

Figure 9:
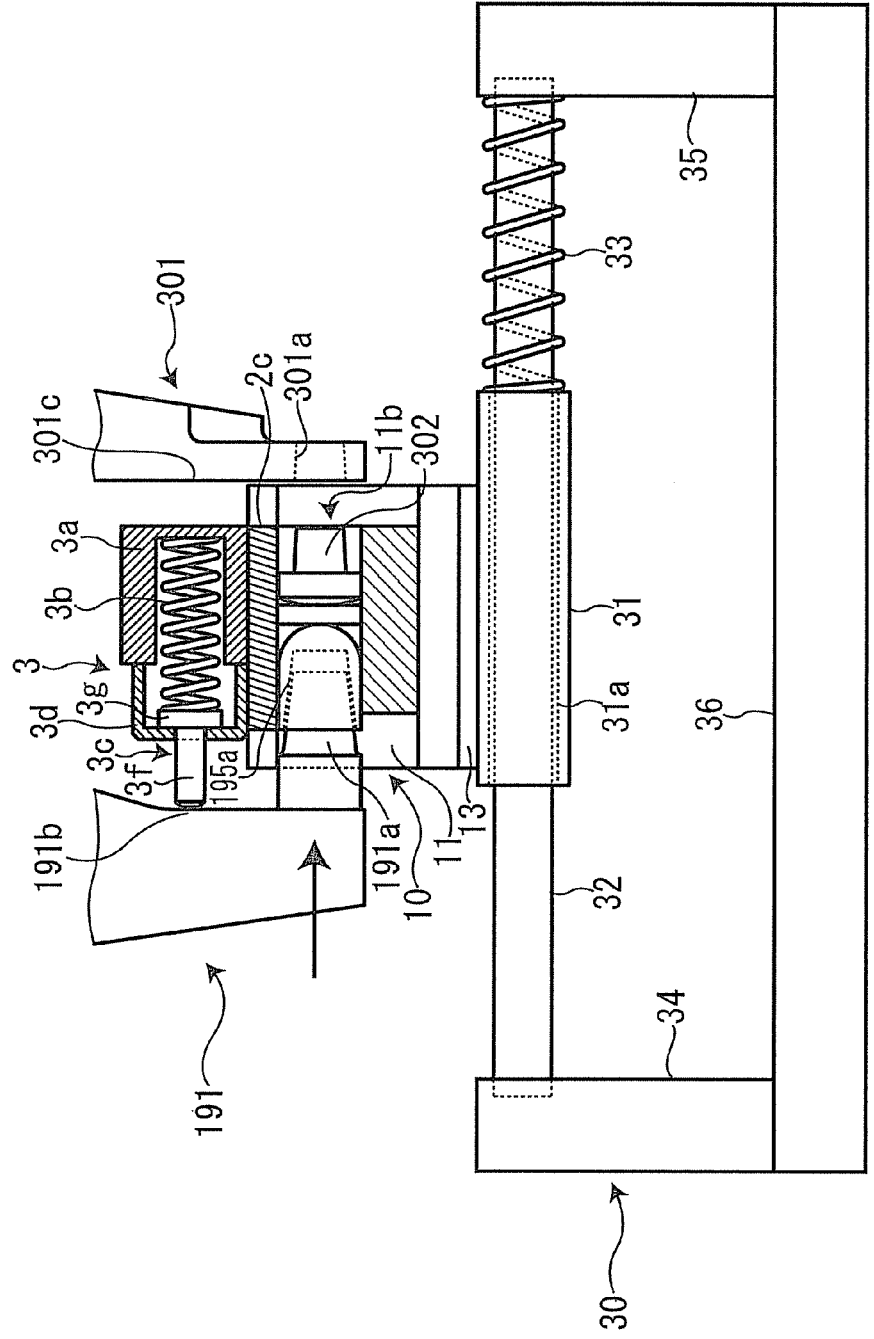
FIG. 9 is an explanatory diagram of how a mini chip and a cap chip are mounted.

Next, with the chip base 301 position being fixed, the arm 191 is closed toward the chip base 301 side, whereby the mounting portion 191a of the arm 191 enters the mounting portion 195a of the cap chip 195, as well as an inner side 191b of the arm 195 makes contact with the abutment portion 3f of the pressing pin 3c (state shown in FIG. 9).

Figure 10:
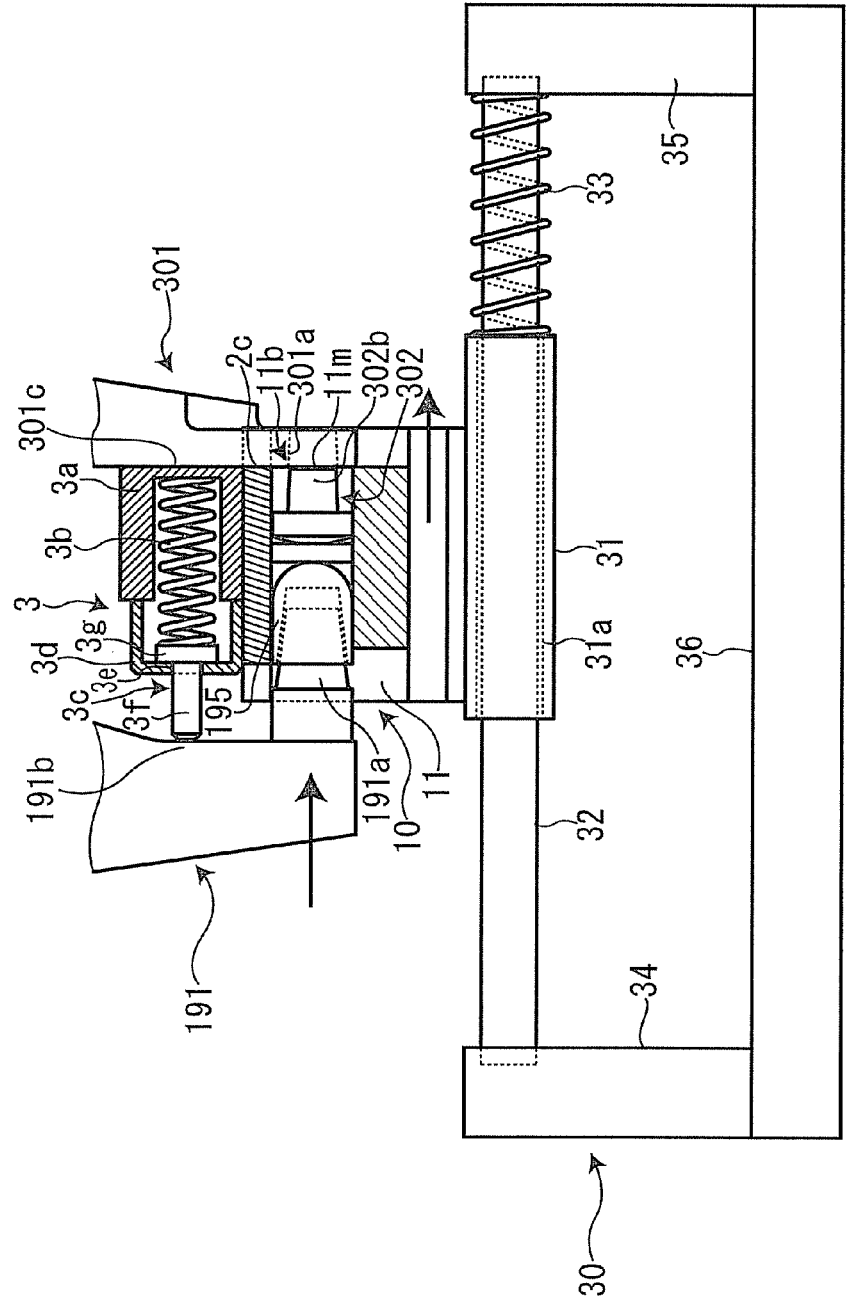
FIG. 10 is an explanatory diagram of how a mini chip and a cap chip are mounted.

From the state of FIG. 9, when the arm 191 is further closed toward the chip base 301 side, the inner side 191b of the arm 191 presses the pressing pin 3c. As mentioned above, the spring constant of the coil spring 33 is smaller than that of the coil spring 3b, so that the coil spring 33 contracts more than the coil spring 3b. Therefore, the entire magazine body 10 mounted on the slide member 31 moves in the direction toward the side plate 35, and stops when the end face 2c of the cover plate 2 abuts on the upper face 301c of the chip base 301 (state shown in FIG. 10). In the state of FIG. 10, the opening plane 11m of the mini chip supply port 11b and the upper face 301c of the chip base 301 coincide with each other. That is, in the state of FIG. 10, the mini chip supply port 11b communicates with the mounting hole 301a of the chip base 301. Due to the structure wherein the coil spring 3b is accommodated inside the main body 3a and pressed by the pressing pin 3c, the coil spring 3b does not buckle and reliably causes the magazine body 10 to move toward the side plate 35 side so that the end face 2c of the cover plate 2 abuts on the upper face 301c of the chip base 301.

Figure 11:
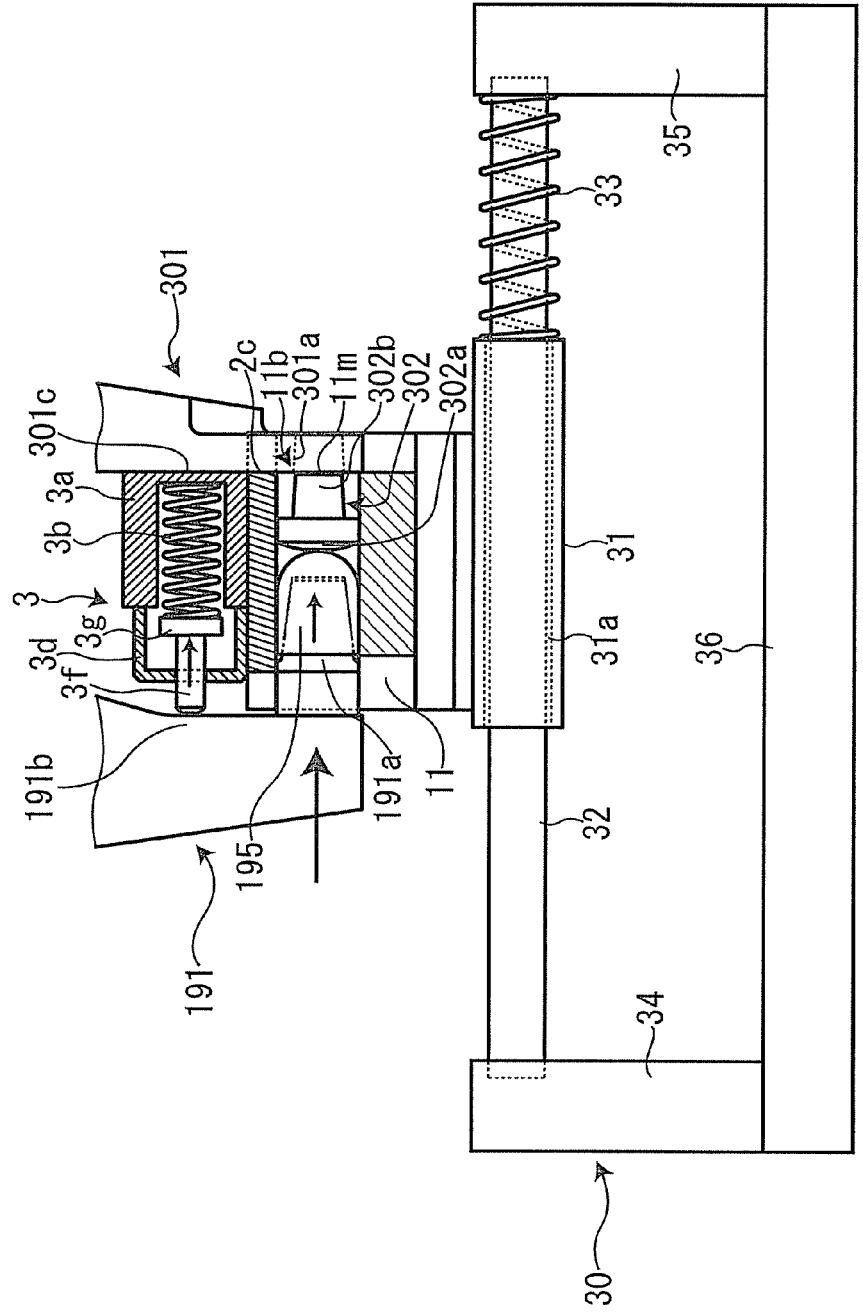
FIG. 11 is an explanatory diagram of how a mini chip and a cap chip are mounted.

As the chip base 301 does not move, when the arm 191 is further closed toward the chip base 301 side from the state of FIG. 10, the coil spring 3b contracts while the arm 191 moves toward the chip base 301 side, whereby the cap chip 195 is completely mounted to the mounting portion 191a of the arm 191 and the cap chip 195 moves toward the mini chip 302 side to make contact with the abutment portion 302a (state shown in FIG. 11).

Figure 12:
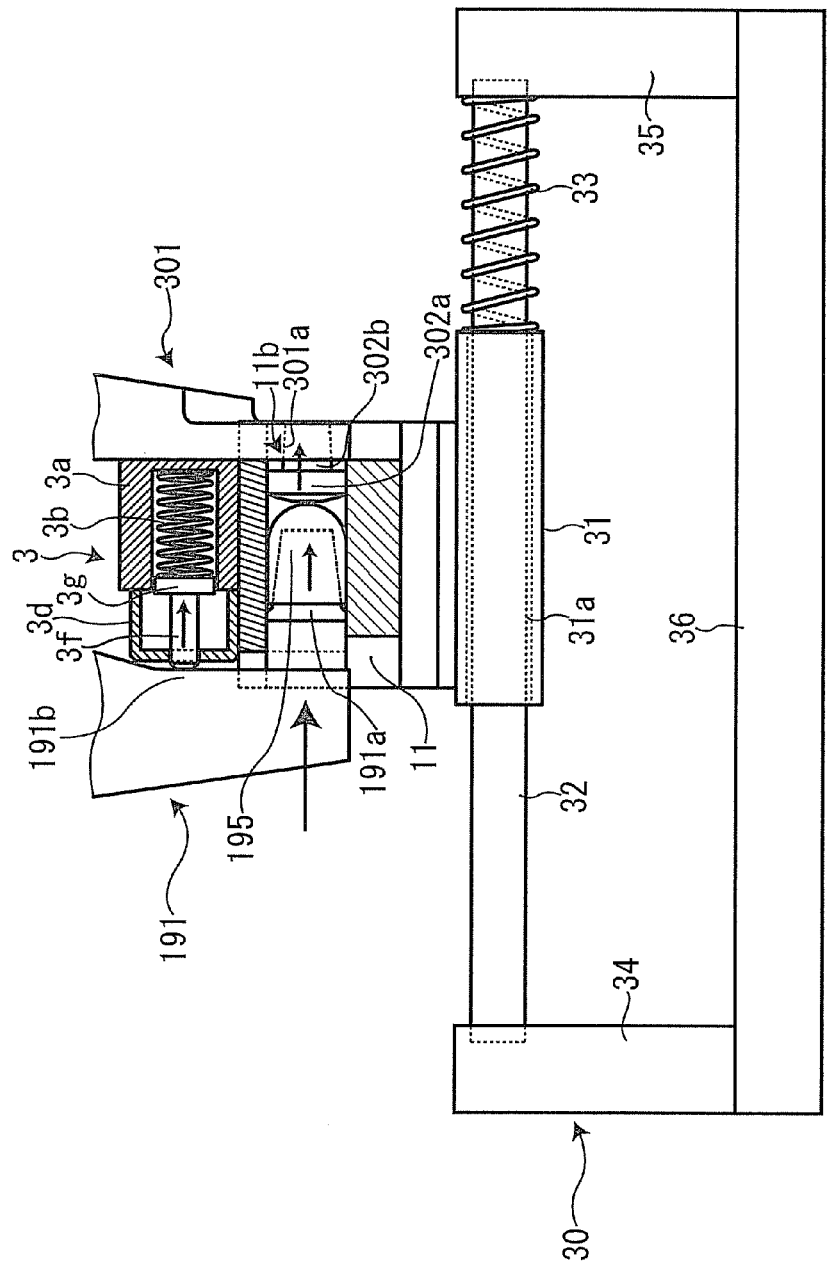
FIG. 12 is an explanatory diagram of how a mini chip and a cap chip are mounted.
Figure 13:
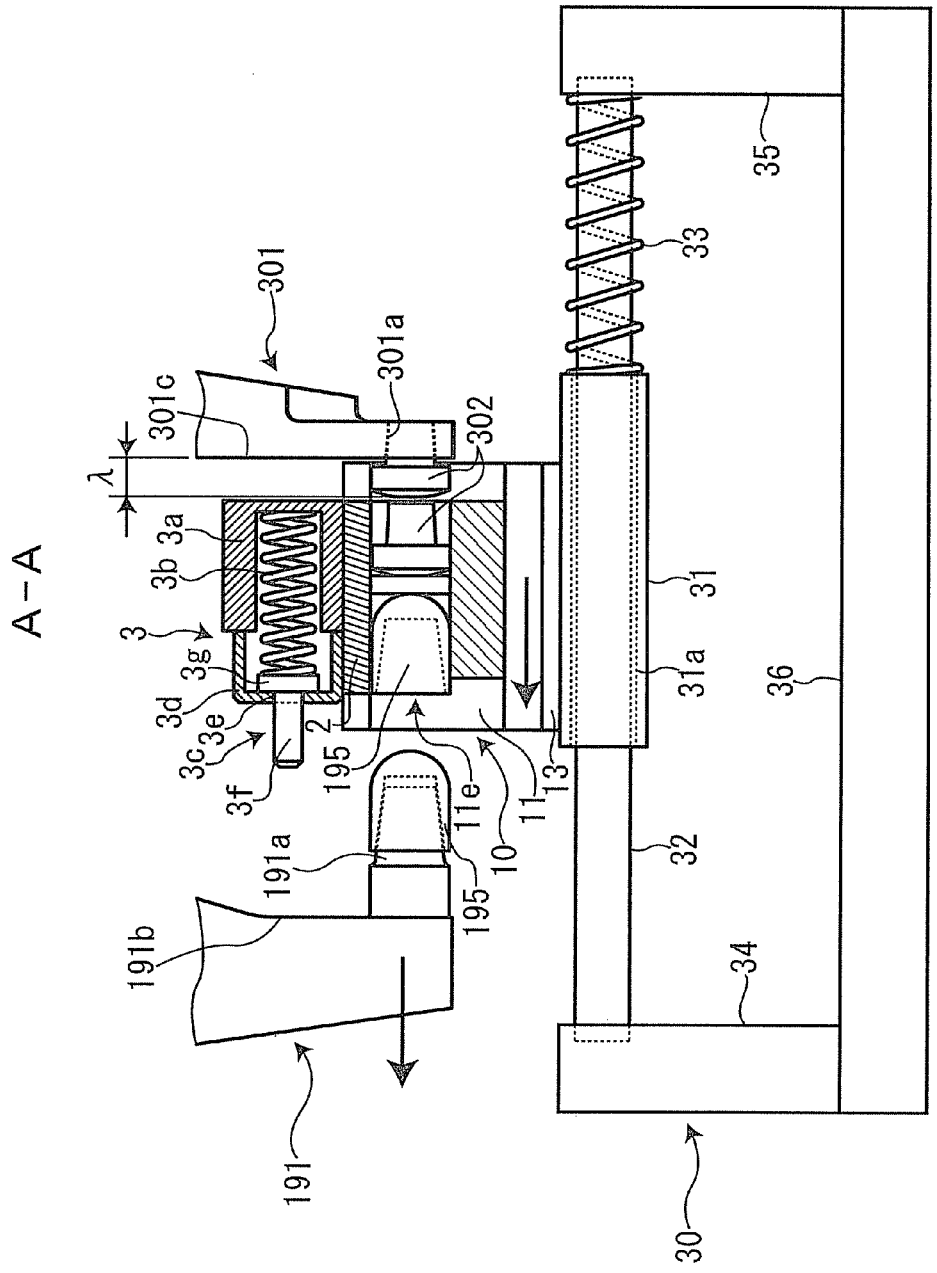
FIG. 13 is an explanatory diagram of how a mini chip and a cap chip are mounted.

From the state of FIG. 11, when the arm 191 is closed toward the chip base 301 side, the cap chip 195 presses the abutment portion 302a of the mini chip 302, whereby the mini chip 302 moves toward the chip base 301 side, causing the mounting portion 302b of the mini chip 302 to enter into the mounting hole 301a of the chip base 301 so that the mini chip 302 is mounted to the chip base 301 (state shown in FIG. 12). In the state of FIG. 11, the mini chip supply port 11b and the mounting hole 301a of the chip base 301 communicate with each other, so that the mini chip 302 does not fall off from the mini chip supply port 11b and the mounting portion 302b of the mini chip 302 can reliably enter into the mounting hole 301a of the chip base 301.

From the state of FIG. 12, when the arm 191 is opened relative to the chip base 301, the cap chip 195 mounted to the arm 191 is escaped from the cap chip supply port 11e, whereupon the cap chips 195 stored in the cap chip storage portion 11d are pushed out by the cap chip push-out member 22 and supplied to the cap chip supply port 11e. At this time, the pressing pin 3c separates from the inner side 191c of the arm 191 so that the magazine body 10 is freed from the pressure applied by the arm 191 toward the side plate 35 side, and the coil spring 33 presses the slide member 31 toward the side plate 34 side so that the magazine body 10 mounted on the slide member 31 slides toward the side plate 34 side. At this time, the mini chip 302 mounted to the chip base 301 is escaped from the mini chip supply port 11b, whereupon the mini chips 302 stored in the mini chip storage portion 11a are pushed out by the mini chip push-out member 12 and supplied to the mini chip supply port 11b (state shown in FIG. 13). In order for the mini chip 302 mounted to the chip base 301 to be completely escaped from the mini chip supply port 11b, the above-mentioned predetermined distance γ(shown in FIG. 8) is set larger than the dimension λ from the upper face 302c of the chip base 301 to the distal end of the mini chip 302.

With this structure wherein the magazine body 10 is slid toward the side plate 34 side by the biasing force of the coil spring 33 to allow the mini chip 302 mounted to the chip base 301 to be escaped from the mini chip supply port 11b, there is no need to teach the robot arm that moves the welding gun a complex movement pattern. If the robot arm was operated to cause the mini chip 302 mounted to the chip base 301 to escape from the mini chip supply port 11b, there would be a possibility that the mini chip 302 may go off the trajectory and move in contact with the mini chip supply port 11b, ending up falling off of the chip base 301. The present invention eliminates such a problem.

In the present invention, when the operation of mounting the cap chip 195 to the arm 191 and the operation of mounting the mini chip 302 to the chip base 301 are complete, cap chips 195 are supplied to the cap chip supply port 11e and mini chips 302 are supplied to the mini chip supply port 11b automatically.

When there are a fewer number of mini chips 302 inside the mini chip storage portion 11a, the mini chips 302 are pushed against the end portion 11n of the mini chip storage portion 11a by the mini chip push-out member 12 with an almost constant force, since the biasing force of the spiral spring 14 is almost constant, and therefore the mini chips 302 will not fall off from the mini chip supply port 11b.

Similarly, when there are a fewer number of cap chips 195 inside the cap chip storage portion 11d, the cap chips 195 are pushed against the end portion 11p of the cap chip storage portion 11d by the cap chip push-out member 22 with an almost constant force, since the biasing force of the spiral spring 24 is almost constant, and therefore the cap chips 195 will not fall off from the cap chip supply port 11e.

In the present invention, the biasing direction of the spiral springs 14 and 24 is inverted by means of the pulleys 15 and 25 to make it possible to provide the spiral springs 14 and 24 on the opposite side of the mini chip supply port 11b (cap chip supply port 11e), so that the area around the mini chip supply port 11b and cap chip supply port 11e is not bulky and there is no interference with the arm 195 or chip base 301 of the welding gun.

(Second Embodiment)

Figure 14:
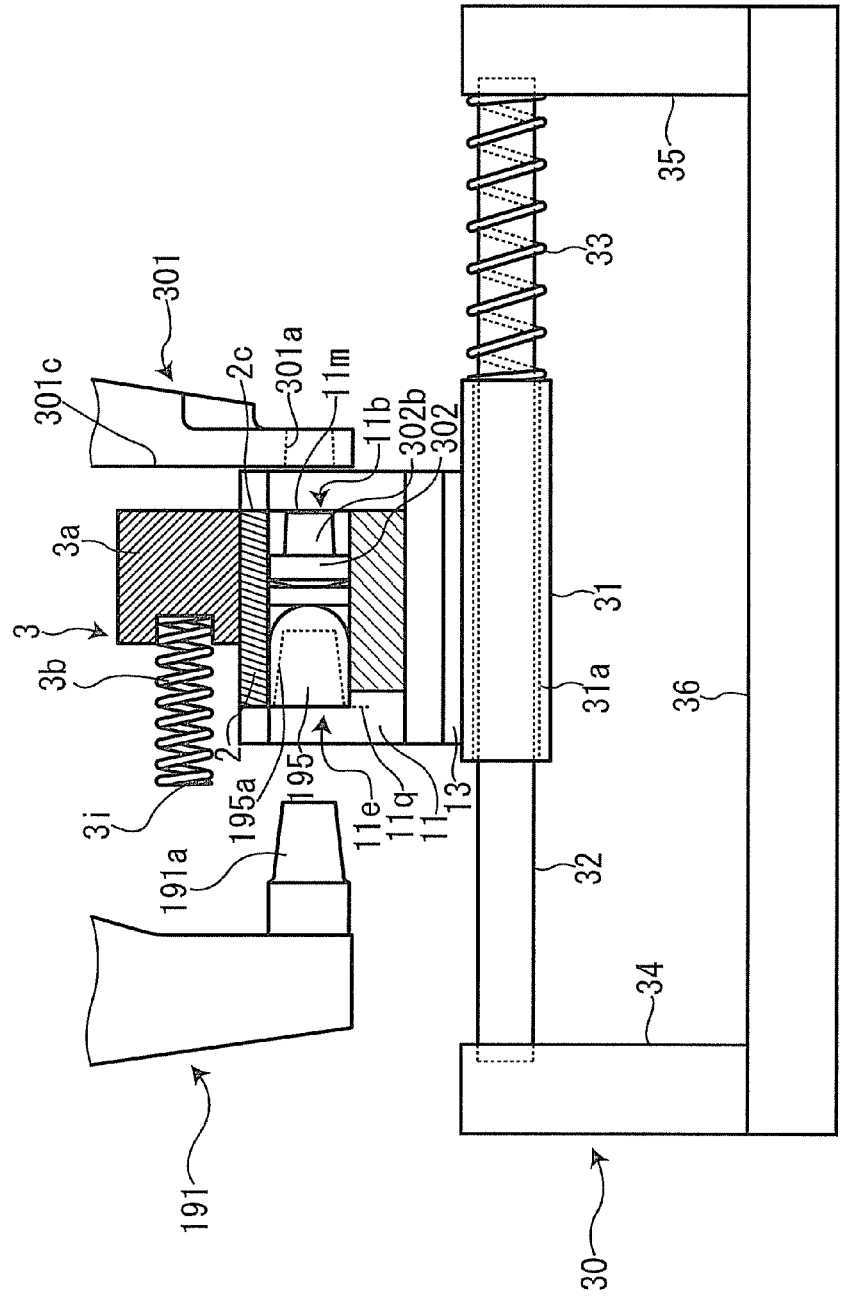
FIG. 14 is a cross sectional view taken along A-A of a second embodiment.
Figure 15:
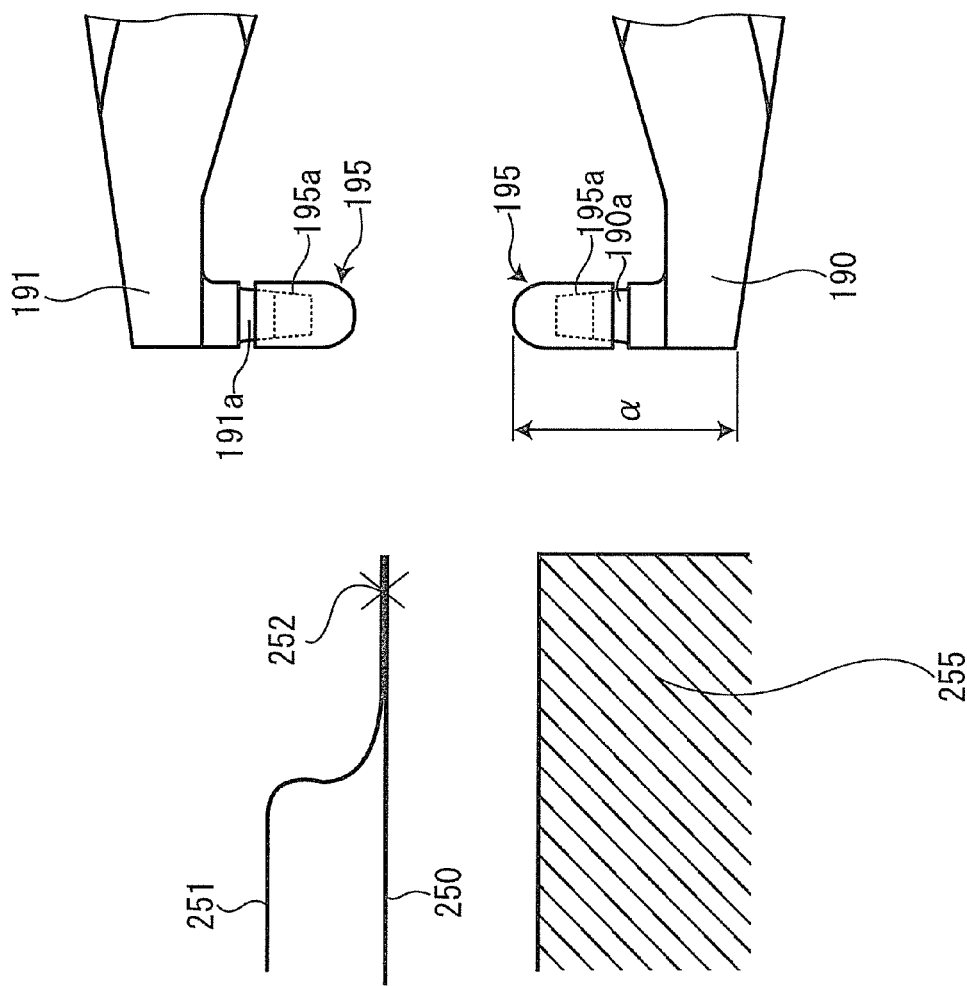
FIG. 15 is an explanatory diagram of spot welding.
Figure 16:
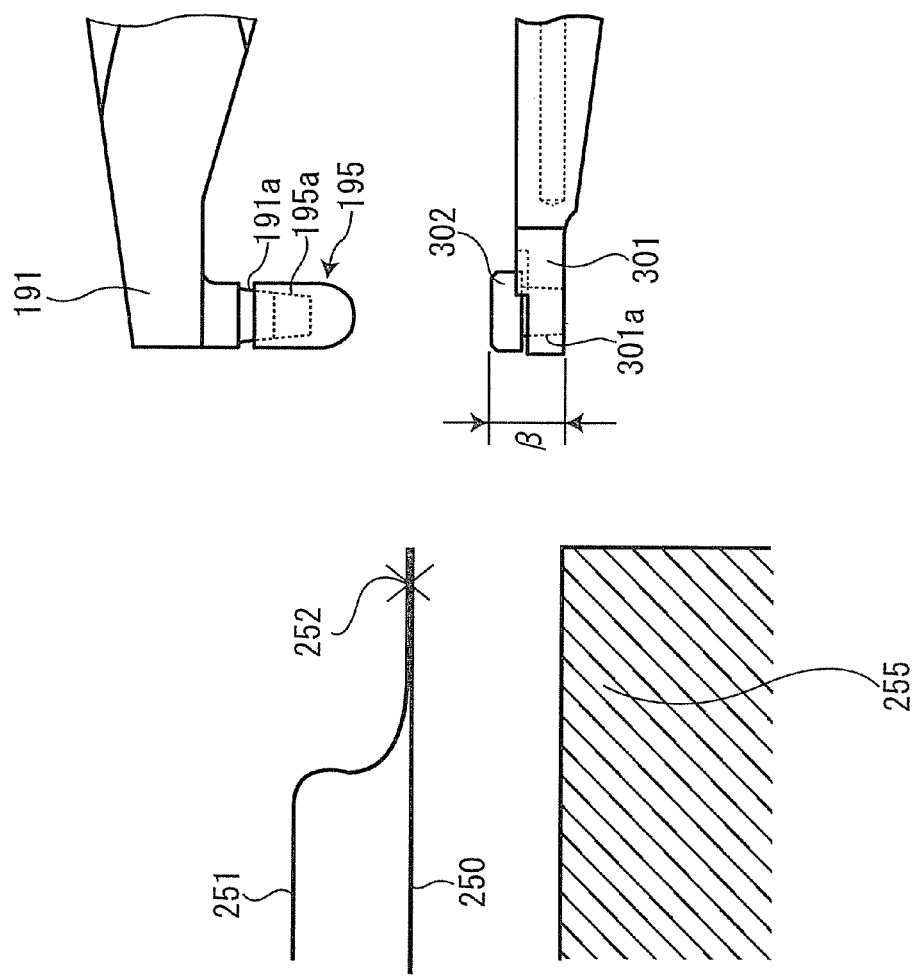
FIG. 16 is an explanatory diagram of spot welding.

A second embodiment will be described with FIG. 14 showing a cross sectional view taken along A-A of the second embodiment. The pressing mechanism 3 of the second embodiment does not use a pressing pin 3c and instead, in this embodiment, the base end of the coil spring 3b is directly attached to the main body 3a. As shown in FIG. 14, the distal end 3i of the coil spring 3b protrudes from the opening plane 11q of the cap chip supply port 11e.

SUMMARY

With a welding gun being not one that is mounted on a robot arm but one that is fixed in an automated welding line, the magazine 50 for spot welding chips of the present invention is mounted on a robot for use. When mounting a cap chip 195 or a mini chip 302, the robot is operated to move the magazine 50 for spot welding chips to a position where the mini chip supply port 11b and the cap chip supply port 11e are aligned with the mounting portion 191a of the arm 191 and the mounting hole 301a of the chip base 301, respectively, and as described above, the arm 191 is closed toward the chip base 301 side, whereupon the cap chip 195 and mini chip 302 are respectively mounted to the arm 191 and chip base 301 of the spot welder.

Although the present invention has been described above in relation to embodiments that are currently believed to be most practical and preferable, it should be understood that the present invention is not limited to the embodiments disclosed in the description of this application but may be changed suitably without departing from the scope of the invention or the basic idea thereof interpreted from the claims and the entire description, and that magazines for spot welding chips with such changes are also included in the technical scope of the invention.

The invention claimed is:

1. A magazine for spot welding chips comprising:
a magazine block formed with a mini chip storage portion along a front to back direction slidably aligning and storing a plurality of mini chips therein, a front end of this mini chip storage portion serving as an externally opened mini chip supply port; and
a first push-out mechanism that pushes out the mini chips stored inside the mini chip storage portion toward a side of the mini chip supply port to feed the mini chips to the mini chip supply port one by one,
wherein the magazine block is formed with a cap chip storage portion in parallel with the mini chip storage portion, the cap chip storage portion slidably aligning and storing a plurality of cap chips therein, a front end of the cap chip storage portion serving as an externally opened cap chip supply port, and a second push-out mechanism is provided that pushes out the cap chips stored inside the cap chip storage portion toward a side of the cap chip supply port to feed the cap chips to the cap chip supply port one by one,
wherein the mini chip supply port and the cap chip supply port communicate with each other, and
wherein a magazine body is formed to slide in a widthwise direction of the magazine body.

2. The magazine for spot welding chips according to claim 1, wherein the first push-out mechanism is formed such that:
a mini chip push-out member is slidably disposed inside the mini chip storage portion;
a pulley is disposed in a front part of the magazine block;
a spiral spring is disposed in a rear part of the magazine block;
the spiral spring and the mini chip push-out member are coupled by a wire, with an intermediate part of the wire being wound around the pulley; and
the mini chip push-out member is pulled toward the side of the mini chip supply port by a biasing force of the spiral spring.

3. The magazine for spot welding chips according to claim 1, wherein the first push-out mechanism is formed such that:
a cap chip push-out member is slidably disposed inside the cap chip storage portion;
a pulley is disposed in a front part of the magazine block;
a spiral spring is disposed in a rear part of the magazine block;
the spiral spring and the cap chip push-out member are coupled by a wire, with an intermediate part of the wire being wound around the pulley; and
the cap chip push-out member is always pulled toward the side of the cap chip supply port by a biasing force of the spiral spring.

4. The magazine for spot welding chips according to claim 1, wherein a biasing means is provided for biasing the magazine body toward the side of the cap chip supply port.

5. The magazine for spot welding chips according to claim 4, wherein the magazine body is mounted on a slide member that slides in a given direction;
   a through hole is formed in the slide member;
   a shaft is passed through the through hole so as to slide the slide member in the given direction; and
   a coil spring is attached to the shaft exposed from the through hole on the side of the mini chip supply port so as to bias the slide member toward the side of the cap chip supply port.

6. The magazine for spot welding chips according to claim 4, wherein a pressing mechanism having a pressing pin that slides in the widthwise direction of the magazine body and a coil spring that biases the pressing pin toward the side of the cap chip supply port is mounted to the magazine body such that a distal end of the pressing pin protrudes from an opening plane of the cap chip supply port with respect to the widthwise direction of the magazine body; and
   the biasing means that biases the magazine body toward the side of the cap chip supply port has a smaller biasing force than that of the coil spring.

7. The magazine for spot welding chips according to claim 4, wherein a coil spring is mounted to the magazine body such that a distal end of the coil spring protrudes from an opening plane of the cap chip supply port with respect to the widthwise direction of the magazine body; and
   the biasing means that biases the magazine body toward the side of the cap chip supply port has a smaller biasing force than that of the coil spring.

* * * * *